United States Patent
Desai et al.

(10) Patent No.: US 11,847,326 B2
(45) Date of Patent: Dec. 19, 2023

(54) STORAGE OPERATION SUSPEND SYSTEM

(71) Applicant: Dell Products L.P., Round Rock, TX (US)

(72) Inventors: Girish Desai, Fremont, CA (US); Frederick K. H. Lee, Mountain View, CA (US)

(73) Assignee: Dell Products L.P., Round Rock, TX (US)

(*) Notice: Subject to any disclaimer, the term of this patent is extended or adjusted under 35 U.S.C. 154(b) by 11 days.

(21) Appl. No.: 17/730,252

(22) Filed: Apr. 27, 2022

(65) Prior Publication Data
US 2023/0350584 A1    Nov. 2, 2023

(51) Int. Cl.
*G06F 12/00* (2006.01)
*G06F 3/06* (2006.01)

(52) U.S. Cl.
CPC .......... *G06F 3/0625* (2013.01); *G06F 3/0653* (2013.01); *G06F 3/0679* (2013.01)

(58) Field of Classification Search
CPC ..... G06F 3/0625; G06F 3/0653; G06F 3/0679
USPC ...................................................... 711/154
See application file for complete search history.

(56) References Cited

U.S. PATENT DOCUMENTS

2001/0056438 A1* 12/2001 Ito ................... G06F 11/2087

FOREIGN PATENT DOCUMENTS

CN           203313057 U  * 11/2013

\* cited by examiner

*Primary Examiner* — Mardochee Chery
(74) *Attorney, Agent, or Firm* — Joseph Mencher

(57) ABSTRACT

A storage operation suspend system includes a chassis having a storage operation suspend subsystem coupled to a communication system and a storage subsystem in the chassis. The storage operation suspend subsystem performs a first storage operation on a storage die in the storage subsystem, receives a second storage operation instruction via the communication system to perform a second storage operation on the storage die, determines that the second storage operation is a higher priority operation than the first storage operation, determines that a first power amount available in a power budget and a second power amount allocated from the power budget to the first storage operation is sufficient to perform the second storage operation when the first storage operation is suspended and, in response, suspends the first storage operation and performs the second storage operation and, following completion of the second storage operation, resumes performance of the first storage operation.

20 Claims, 15 Drawing Sheets

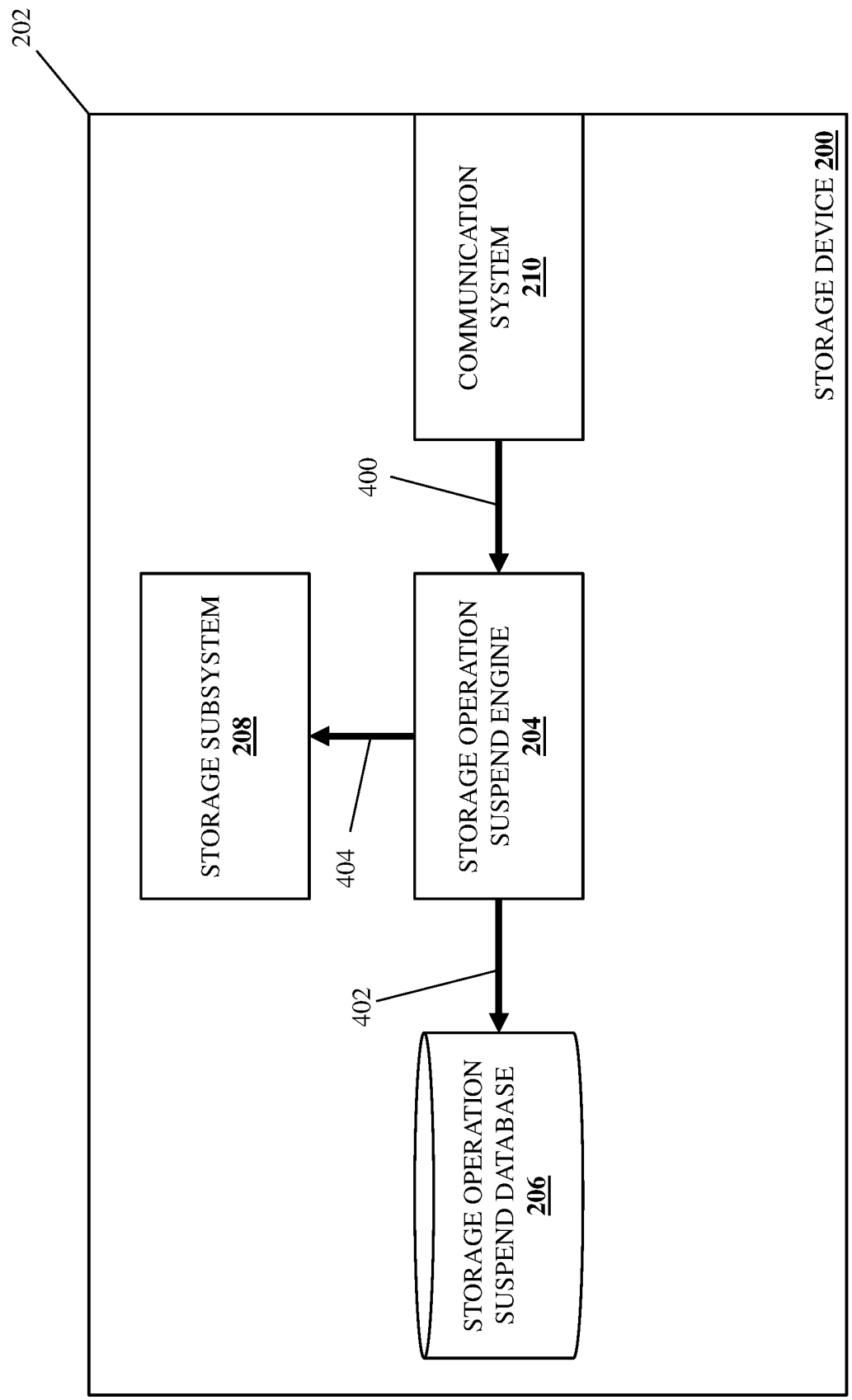

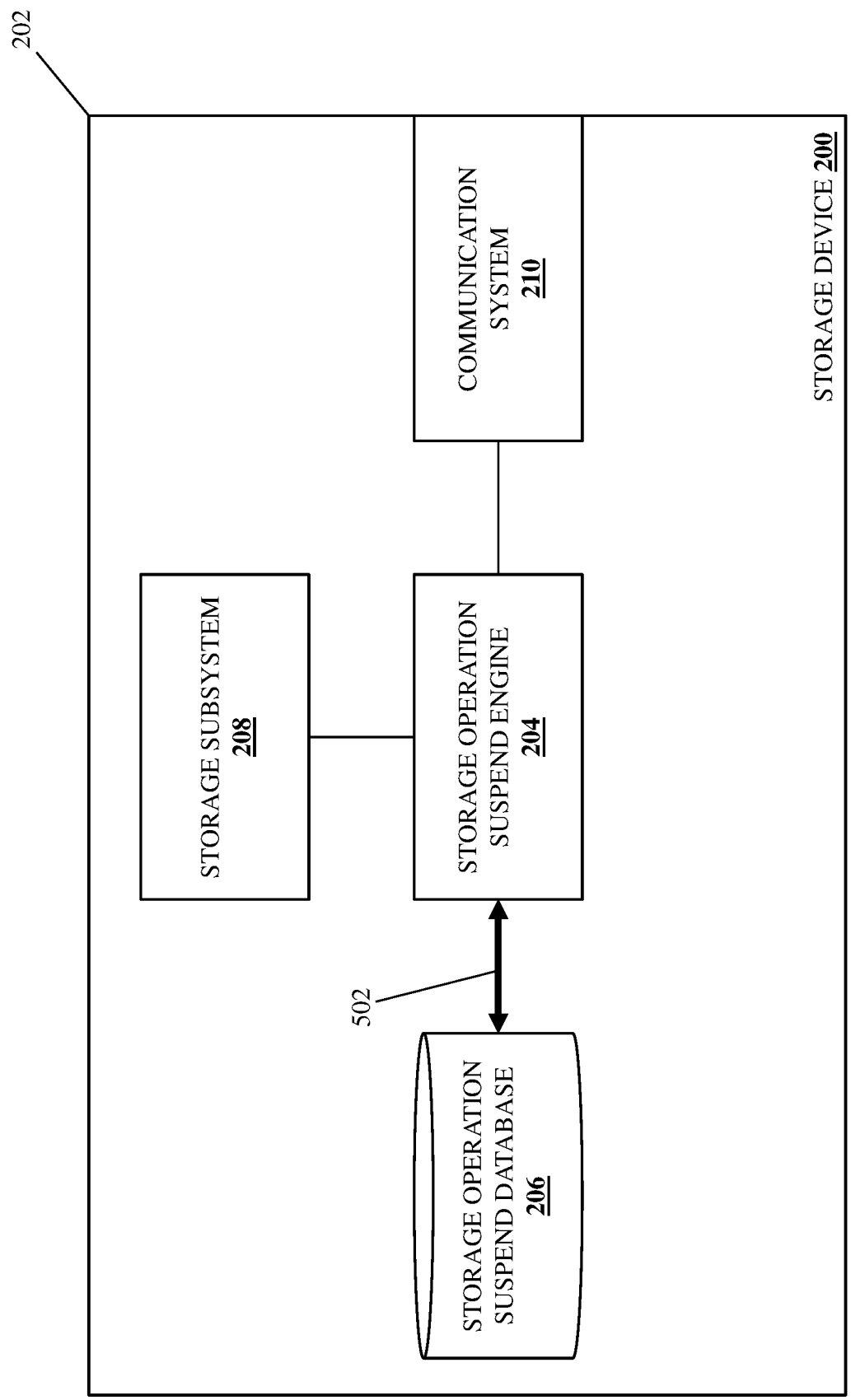

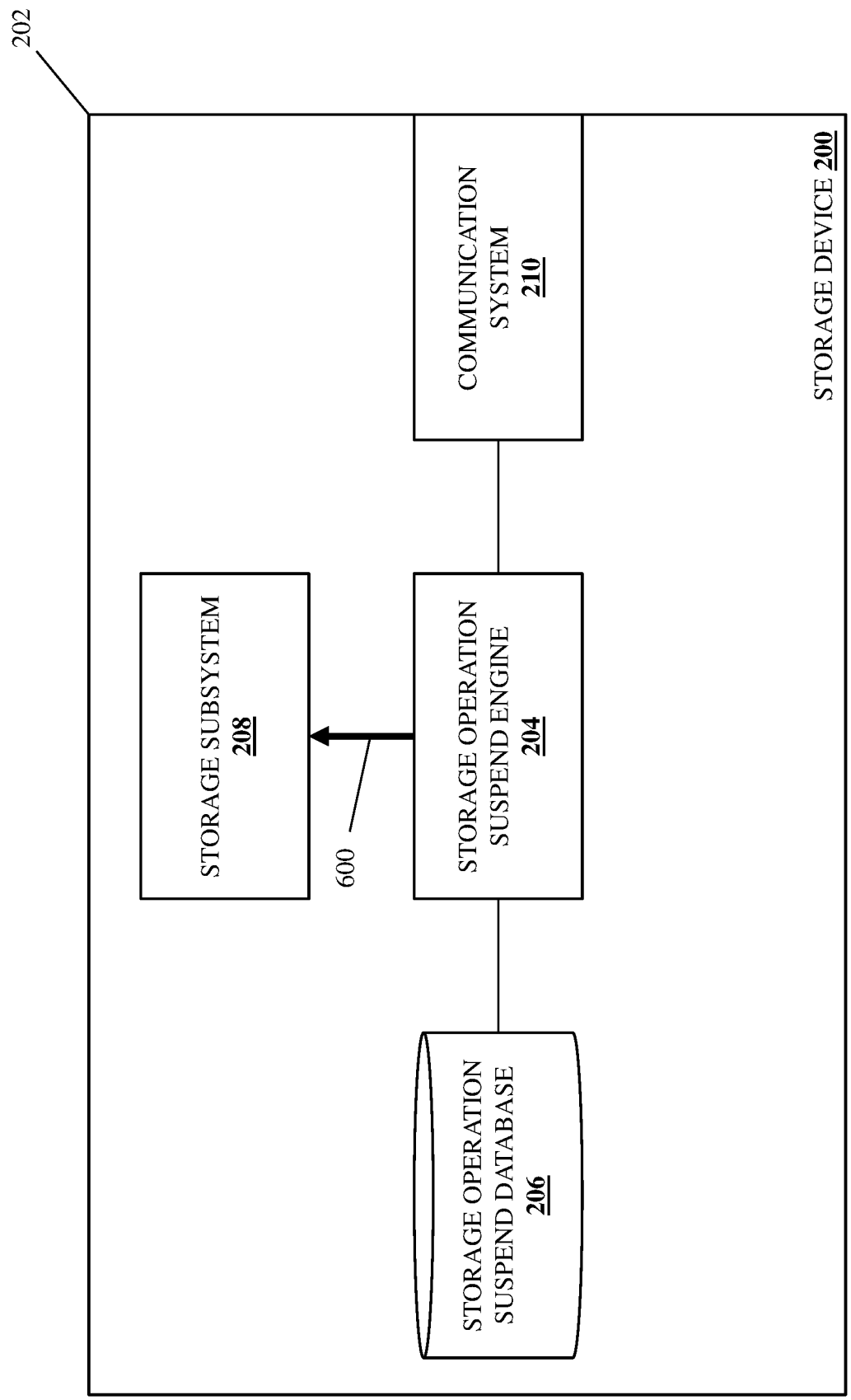

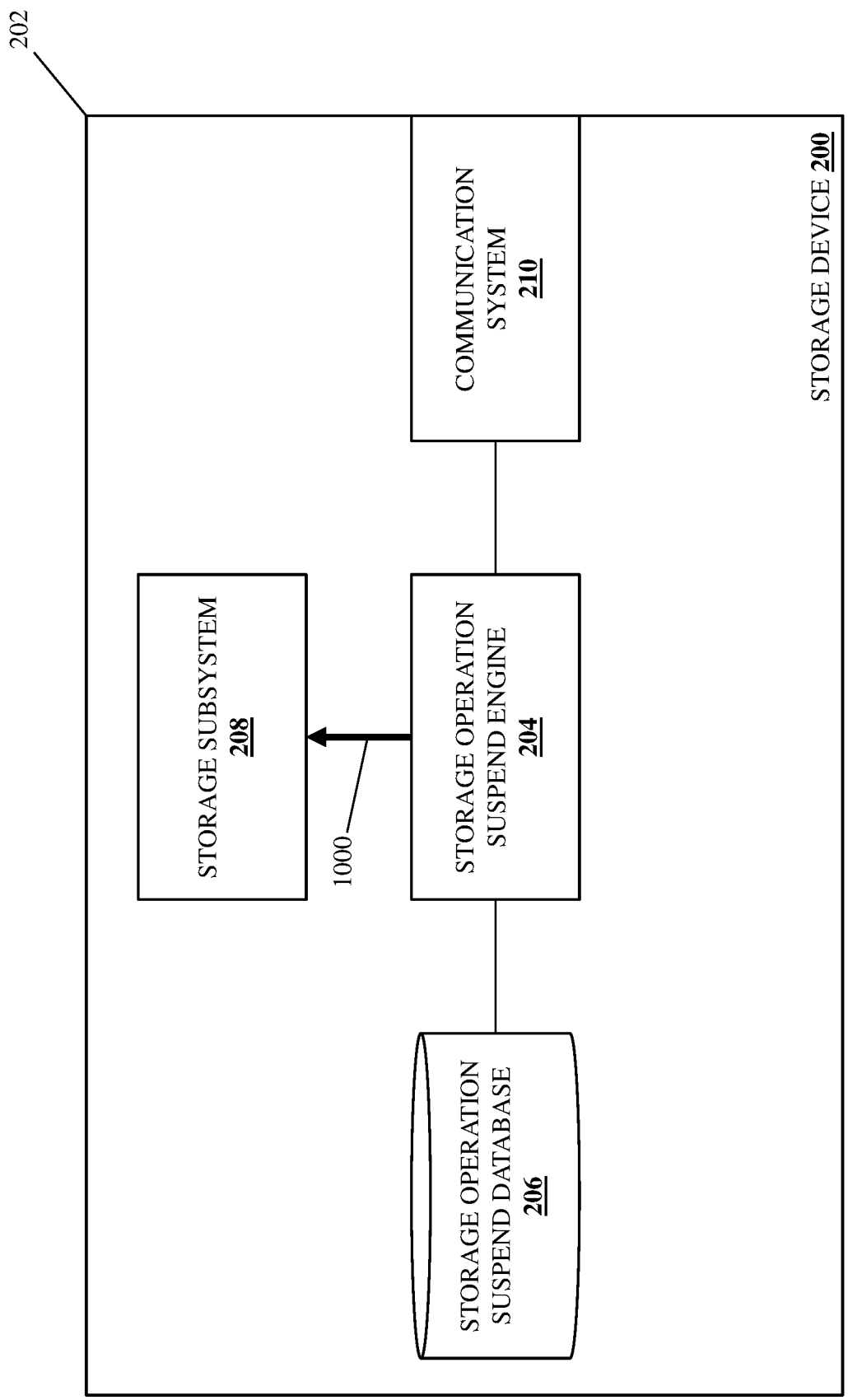

STORAGE OPERATION SUSPEND SYSTEM

BACKGROUND

The present disclosure relates generally to information handling systems, and more particularly to suspending storage operations in a storage device utilized in information handlings systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, store data in storage devices. For example, Solid-State Drive (SSD) storage devices may be provided in computing devices, and may include NAND storage subsystems for storing data as discussed above. As will be appreciated by one of skill in the art in possession of the present disclosure, NAND storage subsystems may include NAND dies having NAND blocks with NAND cells in which data may be stored, and any particular NAND die is generally limited to having one storage operation performed on that NAND die at any particular time (e.g., a NAND die may be limited to having a single program/write storage operation or erase storage operation performed on it at a time, although some newer NAND die allow multiple read storage operations to be performed on them at a time if those read storage operations are performed in different NAND planes).

One of skill in the art in possession of the present disclosure will recognize that the general one-storage-operation-per-NAND-die limitation on storage operations discussed above produces storage device Quality of Service (QoS) issues that are addressed via the use of suspend operations, which allow for the suspension of a "lower priority" (and often relatively longer) storage operation (e.g., program storage operations, erase storage operations) being performed on a NAND die for one or more "higher priority" (and often relatively shorter) storage operations (e.g., read storage operations) that are being requested to be performed on that NAND die, followed by the resuming of that lower priority storage operation when the higher priority storage operation(s) have been completed. To provide a specific example, program storage operations may require approximately 2 milliseconds (ms) and erase storage operations may require approximately 10 ms, while read storage operations may require approximately 60 microseconds ($\mu$s). As such, the latency of a read storage operation may be increased up to 33.3 times (e.g., when delayed by the program storage operation discussed above) or up to 166.7 times (e.g., when delayed by the erase storage operation discussed above) if program storage operations or erase storage operations are not suspended so that the read storage operation may be performed, and thus suspend operations can greatly increase the read QoS and throughput of a storage device utilized to perform mixed program/erase/read workloads.

Furthermore, storage devices such as the SSD storage devices discussed above are typically required to operate within a power constraint in the computing device. For example, an average power constraint for enterprise SSD storage devices that conform to the U.2 computing interface standard is 25 watts (W), while the storage devices conforming to the Enterprise and Data center Standard Form Factor (EDSFF) E3 family of form factors may be provided with an average power constraint that is based on its particular form factor (e.g., with the highest average power budget in that group of form factors being 70 W). SSD storage devices may be operated within their power constraints using power-credit-based schemes in which the storage device is assigned a fixed number of power credits for each storage operation that reflects the average power consumption of that storage operation by a NAND die via "offline" measurements, and a power credit budget may be generated that identifies the amount of power all NAND dies in the storage device are allowed to consume (e.g., a static power credit budget generated by subtracting the worst-case power consumption of all non-NAND components in the storage device from the average power constraint for that storage device, generated via adaptive calculation using a feedback mechanism during storage device runtime, and/or generated using other techniques known in the art).

As will be appreciated by one of skill in the art in possession of the present disclosure, the storage device may be allowed to perform a storage operation when there are sufficient power credits in the power credit budget for that storage operation, and when a storage operation is allowed, corresponding power credits will be allocated to that storage operation and removed from the power credit budget. Thus, in the event there are not sufficient power credits in the power credit budget for a storage operation, that storage operation will be delayed until enough power credits are freed up in the power credit budget (e.g., in response to the completion of other storage operations). However, the combined performance of the conventional power credit budget operations and conventional suspend operations discussed above can raise some issues.

For example, conventional storage devices do not return power credits to the power credit budget when a first storage operation to which those power credits were allocated is suspended (even though that first storage operation no longer consumes power corresponding to those power credits once suspended), as the return of power credits to the power credit budget for the suspended first storage operation introduces the possibility that those power credits will not be available in the power credit budget when that first storage operation may be resumed (e.g., they may have been allocated to a second storage operation while that first storage operation is suspended). As will be appreciated by one of skill in the art in possession of the present disclosure, storage operations may be subject to suspended time limits over which they may not be suspended, and thus the return of power credits for a suspended storage operation can result in that suspended storage operation being suspended for more than their suspended time limit at least in part due to the need to wait for power credits to be freed up so that the suspended storage operation may resume. One of skill in the art will appreciated how the reliability of NAND cells may be degraded if the suspended time limit is exceeded significantly and/or repeatedly on those NAND cells.

Furthermore, while a storage operation may be suspended multiple times, each time a suspended operation is resumed, a "suspension/resume overhead" is incurred For example, if multiple higher priority storage operations are being requested to be performed on a NAND die on which a lower priority storage operation is being performed, it is more efficient to suspend the lower priority storage operation once and perform all the higher priority storage operations one by one before resume performance of the lower priority storage operation (with the assumption that the suspended time limit is not exceeded and there are sufficient power credits in the power credit budget to perform each higher priority storage operation as discussed below).

Thus, conventional storage devices reserve power credits for suspended storage operations in order to ensure that those power credits are available so that those suspended storage operations may be resumed before their suspended time limits are exceeded, but doing so may prevent other storage operations from being performed (e.g., due to insufficient power credits in the power credit budget) even when NAND die are available for the performance of those other storage operations. As such, conventional storage devices "sacrifice"/reduce the QoS, throughput, and/or other performance characteristics of the storage device to ensure that the suspended time limits of storage operations are not exceeded. To provide a specific example, a program storage operation or erase storage operation being performed on a NAND die will only be suspended for a read storage operation instructed for that NAND die if the power credit budget includes enough power credits to perform that read storage operation, without consideration of the power credits allocated to that program storage operation or erase storage operation that will be suspended. As such, the read storage operation will be delayed until sufficient power credits are in the power credit budget (e.g., those power credits are returned to the power credit budget from other storage operation(s) being performed on NAND die(s) in the storage device to allow the program storage operation or erase storage operation to be suspended, those power credits are returned to the power credit budget based on the program storage operation or erase storage operation completing, etc.).

Accordingly, it would be desirable to provide a storage operation suspend system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a storage operation suspend engine that is configured to: perform a first storage operation on a storage die included in a storage subsystem; receive a second storage operation instruction to perform a second storage operation on the storage die in the storage subsystem; determine that the second storage operation is a higher priority operation than the first storage operation; determine that a first power amount available in a power budget and a second power amount allocated from the power budget to the first storage operation is sufficient to perform the second storage operation when the first storage operation is suspended and, in response, suspend the first storage operation and perform the second storage operation; and resume, following completion of the second storage operation, performance of the first storage operation.

BRIEF DESCRIPTION OF THE DRAWINGS

FIG. 4 is a schematic view illustrating an embodiment of the storage device of FIG. 2 operating during the method of FIG. 3.

FIG. 5B is a schematic view illustrating an embodiment of the storage device of FIG. 2 operating during the method of FIG. 3.

FIG. 6A is a schematic view illustrating an embodiment of the storage device of FIG. 2 operating during the method of FIG. 3.

FIG. 10 is a schematic view illustrating an embodiment of the storage device of FIG. 2 operating during the method of FIG. 3.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
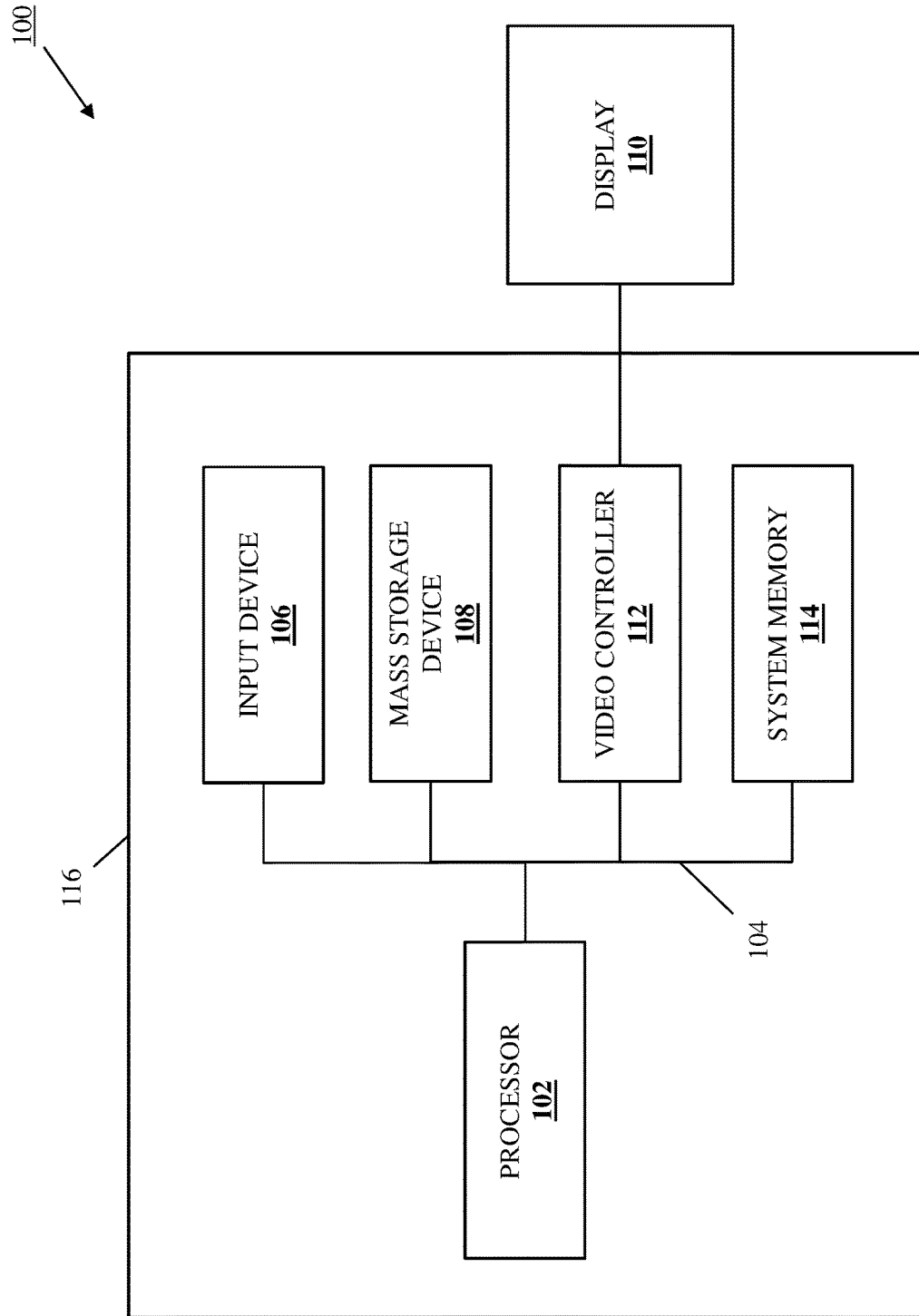
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
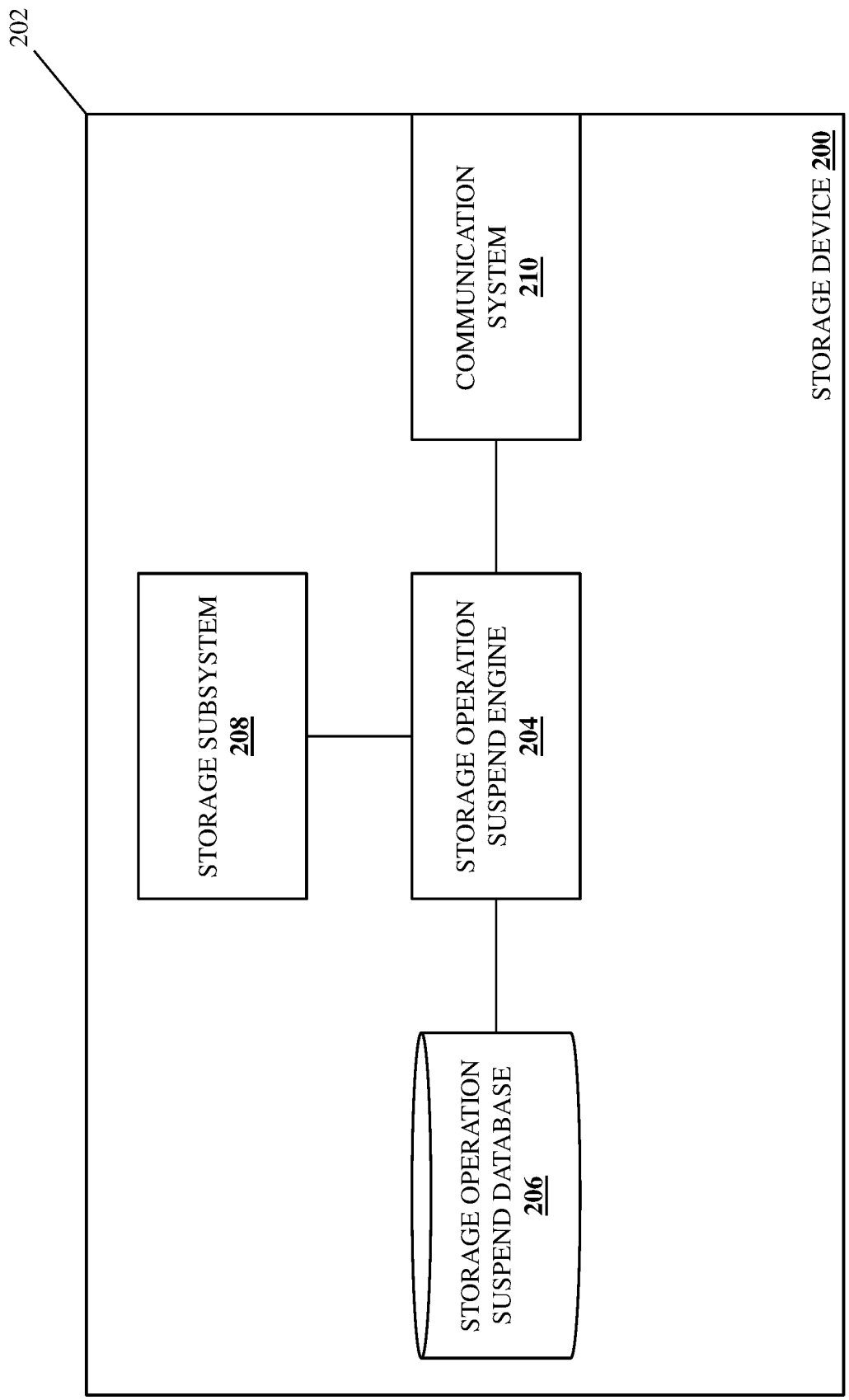
FIG. 2 is a schematic view illustrating an embodiment of a storage device that may include the storage operation suspend system of the present disclosure.

Referring now to FIG. 2, an embodiment of a storage device 200 is illustrated that may include the storage operation suspend system of the present disclosure. As such, the storage device 200 may be provided by the IHS 100 discussed above with reference to FIG. 1, may provide a component in the IHS 100 (e.g., the storage device 108 discussed above with reference to FIG. 1), and in the specific examples is discussed below as being provided by a Solid State Drive (SSD) storage device. Furthermore, while illustrated and discussed as being provided by an SSD storage device, one of skill in the art in possession of the present disclosure will recognize that the functionality of the storage device 200 discussed below may be provided by other devices that are configured to operate similarly as the storage device 200 discussed below. In the illustrated embodiment, the storage device 200 includes a chassis 202 that houses the components of the storage device 200, only some of which are illustrated and discussed below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a storage operation suspend engine 204 that is configured to perform the functionality of the storage operation suspend engines, storage firmware, and/or storage devices discussed below.

The chassis 202 may also house a storage element that is coupled to the storage operation suspend engine 204 (e.g., as part of the storage firmware discussed above) and that includes (e.g., as part of the storage firmware discussed above) a database 206 that is configured to store the tables, power budget information, and/or any of the information utilized by the storage operation suspend engine 204 discussed below. The chassis 202 may also house a storage subsystem 208 that is coupled to the storage operation suspend engine 204 (e.g., via a coupling between the storage subsystem 208 and the processing system that provides the storage operation suspend engine 204/storage firmware) and that, in the specific examples below, is provided by a NAND storage subsystem having NAND dies including NAND blocks. However, while described as being provided by a NAND storage subsystem, one of skill in the art in possession of the present disclosure will appreciate how other storage technologies may benefit from the teachings of the present disclosure, and thus may be utilized to provide the storage subsystem 208 while remaining within the scope of the present disclosure as well.

The chassis 202 may also house a communication system 210 that is coupled to the storage operation suspend engine 204 (e.g., via a coupling between the communication system 308 and the processing system that provides the storage operation suspend engine 204/storage firmware) and that may be provided by any of a variety of storage device communication components that would be apparent to one of skill in the art in possession of the present disclosure. However, while a specific storage device 200 has been illustrated, one of skill in the art in possession of the present disclosure will recognize that storage devices (or other devices operating according to the teachings of the present disclosure in a manner similar to that described below for the storage device 200) may include a variety of components and/or component configurations for providing conventional storage device functionality, as well as the functionality discussed below, while remaining within the scope of the present disclosure as well.

Figure 3A:
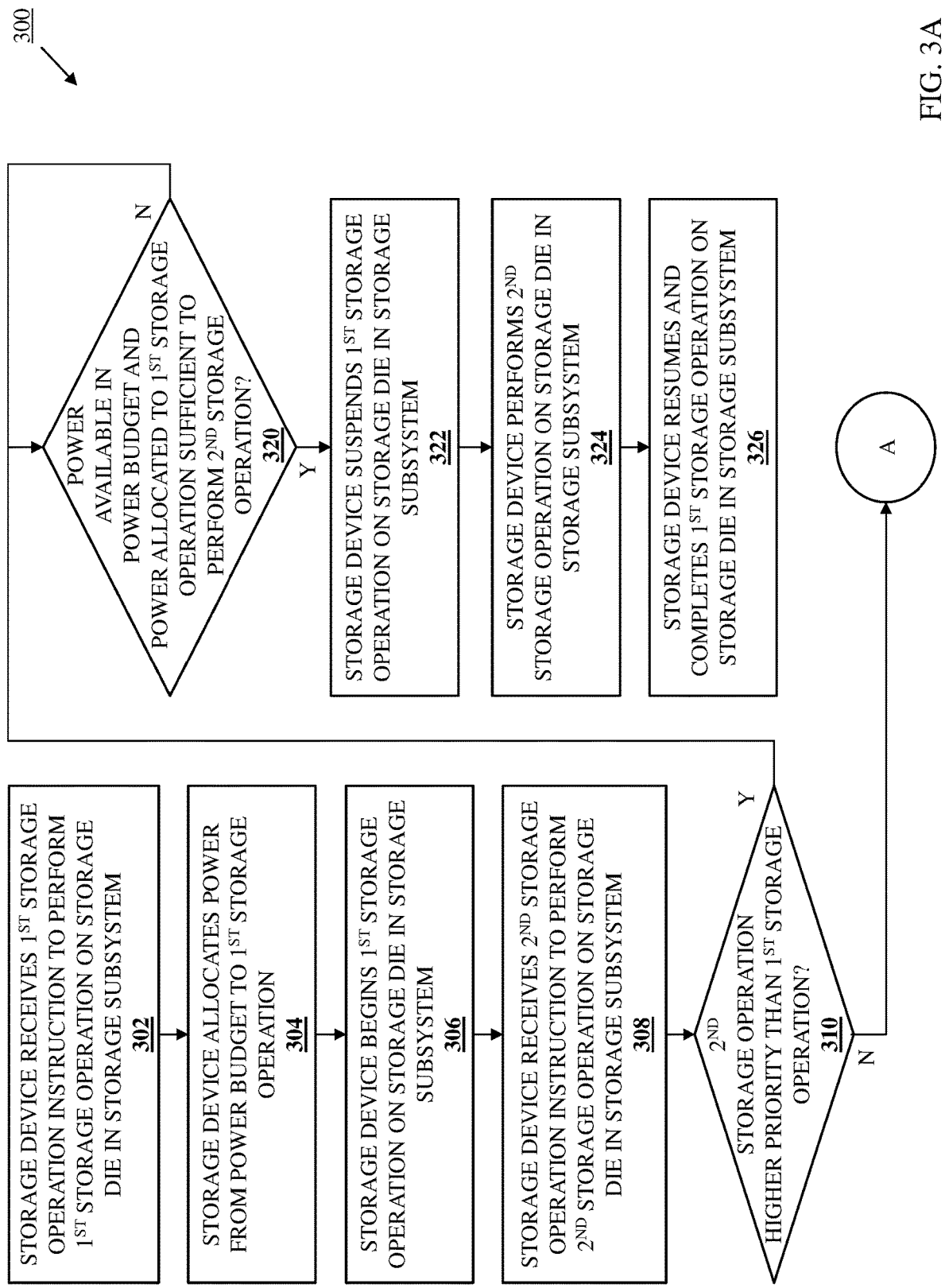
FIG. 3A is a flow chart illustrating an embodiment of a portion of a method for suspending storage operations in a storage device.
Figure 3B:
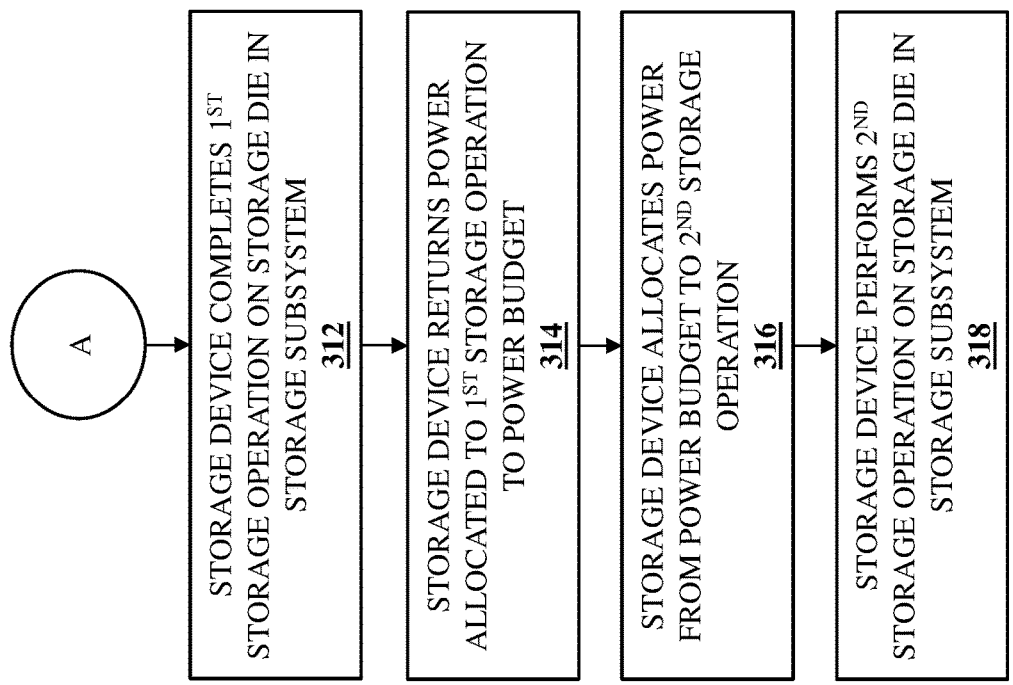
FIG. 3B is a flow chart illustrating an embodiment of a portion of the method for suspending storage operations in a storage device of FIG. 3A.

Referring now to FIGS. 3A and 3B, an embodiment of a method 300 for suspending storage operations in a storage device is illustrated. As discussed below, the systems and methods of the present disclosure provide for the suspension of a first storage operation being performed on a storage die so that a second storage operation may be performed on that storage die when available power in a power budget and power allocated to the first storage operation is sufficient to perform the second storage operation. For example, the storage operation suspend system of the present disclosure may include a chassis having a storage operation suspend subsystem coupled to each of a communication system and a storage subsystem in the chassis. The storage operation suspend subsystem performs a first storage operation on a storage die in the storage subsystem, receives a second storage operation instruction via the communication system to perform a second storage operation on the storage die, determines that the second storage operation is a higher priority operation than the first storage operation, determines that a first power amount available in a power budget and a second power amount allocated from the power budget to the first storage operation is sufficient to perform the second storage operation when the first storage operation is suspended and, in response, suspends the first storage operation and performs the second storage operation and, following completion of the second storage operation, resumes performance of the first storage operation. As such, the determination of whether to suspend the first storage operation takes into account the power allocated for that first storage operation, as compared to conventional storage operation suspend systems that require the power budget alone includes enough power to perform the second storage operation before the first storage operation will be suspended.

The method 300 begins at block 302 where a storage device receives a first storage operation instruction to perform a first storage operation in a storage subsystem. As will be appreciated by one of skill in the art in possession of the present disclosure, the storage device 200 discussed above with reference to FIG. 2 may be provided in a computing device (e.g., the IHS 100 discussed above with reference to FIG. 1) and may receive instructions to perform a first storage operation in its storage subsystem 208 from a host subsystem provided by the processor 102/memory 114 such as an operating system, an application, and/or other host systems that would be apparent to one of skill in the art in possession of the present disclosure. For example, with reference to FIG. 4, in an embodiment of block 302 the storage operation suspend engine 204 in the storage device 200 may perform storage operation instruction receiving operations 400 that include receiving a storage operation instruction from a host system via the communication system 210.

In the specific examples provided below, the storage operation instruction received at block 302 is described by a program storage operation instruction or an erase storage operation instruction, but as discussed below read storage operation instructions, administrative command storage operation instructions, and/or a variety of other storage operation instructions will fall within the scope of the present disclosure as well. Furthermore, while some specific examples below describe a storage operation instruction that instructs an erase storage operation, one of skill in the art in possession of the present disclosure will recognize that program, read, and/or erase storage operations may be initiated by the storage operation suspend engine 204 and thus need not be instructed/performed in response to a corresponding storage operation instruction (in which case block 302 of the method 300 may be skipped). One of skill in the art in possession of the present disclosure will appreciate that the first storage operation instructed at block 302 may be performed on a storage die in the storage subsystem 208, and which storage die in the storage subsystem 208 upon which the first storage operation will be performed may be determined by the storage operation suspend engine 204 (e.g., a program storage operation or an erase storage operation), identified via the storage operation instruction (e.g., a read storage operation), and/or determine using a variety of other techniques that would be apparent to one of skill in the art in possession of the present disclosure.

The method 300 then proceeds to block 304 where the storage device allocates power from a power budget to the first storage operation. With reference back to FIG. 4, in an embodiment of block 304, the storage operation suspend engine 204 in the storage device 200 may perform power allocation operations 402 that include allocating power from a power budget of the storage device 200 that may be tracked in the storage operation suspend database 206. As such, the storage operation suspend database 206 may include power budget information that identifies a power budget for the storage device 200 (e.g., 25 W, 70 W, or any other power budget that would be apparent to one of skill in the art in possession of the present disclosure). In the examples below, the power budget is described as a power credit budget that abstracts subsets of power from a power budget of the storage device 200 into power credits that then may be allocated to storage operations. However, one of skill in the art in possession of the present disclosure will recognize that the power budget described herein may have its associated power allocated in a variety of manners that will fall within the scope of the present disclosure as well.

In some embodiments, the storage operation suspend database 206 may store a storage operation power credit table, an example of which is provided below:

| STORAGE OPERATION | POWER CREDITS |
| --- | --- |
| Single-Plane Read | 35 |
| Multi-Plane Read | 55 |
| Fast Multi-Plane Read | 65 |
| Program | 50 |
| Erase | 60 |

In the example of the storage operation power credit table above, a single-plane read storage operation requires 35 power credits, a multi-plane read storage operation requires 55 power credits, a fast multi-plane read storage operation requires 65 power credits, a program storage operation requires 50 power credits, and an erase storage operation requires 60 power credits. As will be appreciated by one of skill in the art in possession of the present disclosure, the storage operations and associated power credits in the storage operation power credit table above are merely examples of possible storage operations and associated power credits, and that power credits may be predetermined for their associated storage operations and stored in hardware registers, firmware, or other storage elements that provide the storage operation suspend database 206 using a variety of techniques that would be apparent to one of skill in the art in possession of the present disclosure.

Thus, at block 304, the power allocation operations 402 performed by the storage operation suspend engine 204 may include identifying the storage operation, determining the power credits required for that storage operation, and allocating those power credits to that storage operation by, for example, subtracting those power credits from the power credit budget. To provide a specific example, the storage operation suspend engine 204 may perform the power allocation operations 402 to determine that the storage operation instruction received at block 304 identifies a program storage operation, determining that 50 power credits are required for the program storage operation, and allocating those 50 power credits to the program storage operation by, for example, subtracting 50 power credits from the power credit budget being tracked in the storage operation suspend database 206. In another specific example, the storage operation suspend engine 204 may perform the power allocation operations 402 to determine that the storage operation instruction received at block 304 identifies an erase storage operation, determining that 60 power credits are required for the erase storage operation, and allocating those 60 power credits to the erase storage operation by, for example, subtracting 60 power credits from the power credit budget being tracked in the storage operation suspend database 206. However, while examples of specific storage operations are provided, one of skill in the art in possession of the present disclosure will appreciate how any storage operation may have power allocated for its performance at block 304 while remaining within the scope of the present disclosure as well.

The method 300 then proceeds to block 306 where the storage device begins the first storage operation on the storage die in the storage subsystem. With reference back to FIG. 4, in an embodiment of block 306, the storage operation suspend engine 204 in the storage device 200 may perform storage operation performance operations 404 that include beginning the performance of the storage operation instructed at block 302 on the storage die in the storage subsystem 208 determined or identified at block 302. To provide a specific example in which the storage subsystem 208 is a NAND storage subsystem, the storage operation performance operations 404 may include the performance of the program storage operation or the erase storage operations discussed above on one or more NAND blocks in a NAND die in that NAND storage subsystem. However, while a specific storage subsystem is described in the examples provided herein, one of skill in the art in possession of the present disclosure will appreciate how other storage subsystems may benefit from the teachings of the present disclosure and thus will fall within its scope as well.

Figure 5A:
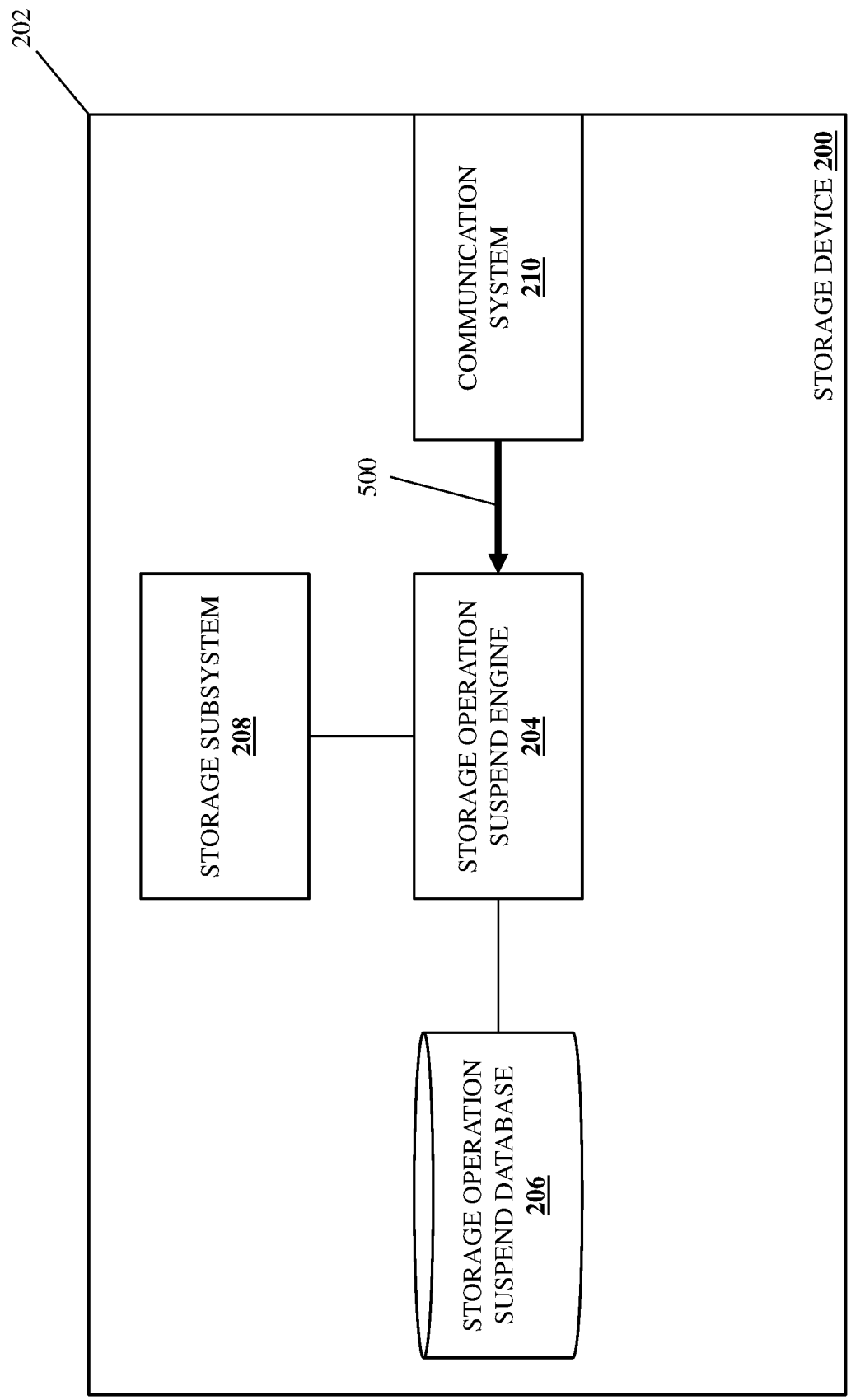
FIG. 5A is a schematic view illustrating an embodiment of the storage device of FIG. 2 operating during the method of FIG. 3.

The method 300 then proceeds to block 308 where the storage device receives a second storage operation instruction to perform a second storage operation in the storage subsystem. As will be appreciated by one of skill in the art in possession of the present disclosure, the storage device 200 may receive instructions from the host subsystem to perform a second storage operation on a storage die in its storage subsystem 208 while the storage device 200 is currently performing a first storage operation on that storage die. For example, with reference to FIG. 5A, in an embodiment of block 308 and subsequent to beginning the first storage operation on the storage die in the storage subsystem 208 at block 306 but prior to the completion of that first storage operation, the storage operation suspend engine 204 in the storage device 200 may perform storage operation instruction receiving operations 500 that include receiving a storage operation instruction from a host system via the communication system 210, with that storage operation instruction instructing the performance of a storage operation that will be performed on the storage die in the storage subsystem 208 that the storage operation suspend engine 204 is currently performing the first storage operation on.

In the specific examples provided below, the storage operation instruction received at block 308 is described as a read storage operation instruction, but as discussed below a variety of other storage operation instructions will fall within the scope of the present disclosure as well. One of skill in the art in possession of the present disclosure will appreciate that the performance of the second storage operation instructed at block 308 may utilize the storage die in the storage subsystem 208 on which the first storage operation instructed at block 302 is currently being performed, and the determination that the second storage operation should be performed on that storage die in the storage subsystem 208 may be a result of that storage die being identified via the storage operation instruction (e.g., via a read storage operation), determined by the storage operation suspend engine 204 (e.g., via a program storage operation or an erase storage operation), and/or determined using a variety of other techniques that would be apparent to one of skill in the art in possession of the present disclosure.

As such, one of skill in the art in possession of the present disclosure will appreciate how the storage operation suspend engine 204 in the storage device 200 may be configured to identify any storage die in the storage subsystem 208 on which a second storage operation will be performed, and then identify the state of that storage die (e.g., whether that storage die is "idle" (e.g., currently subject to a storage operation) or not). In some embodiments, the storage operation suspend engine 204 in the storage device 200 may be configured to identify, in real-time, a storage subsystem address or address range in the storage subsystem 208 to which performance of a second storage operation is directed in order to identify the storage die in the storage subsystem 208 on which that second storage operation will be performed, and then determine, in real-time, the state of that storage die, e.g., whether that storage die is idle or otherwise not currently subject to a first storage operation, or whether that storage die is not idle or otherwise is currently subject to a first storage operation. Thus, at block 308, a second storage operation is instructed that will be performed on the storage die that the first storage operation is currently being performed.

The method 300 then proceeds to decision block 310 where it is determined whether the second storage operation is higher priority than the first storage operation. With reference to FIG. 5B, in an embodiment of decision block 310 and in response to receiving an instruction to perform the second storage operation that will be performed on the storage die that the first storage operation is currently being performed, the storage operation suspend engine 204 in the storage device 200 may perform storage operation priority determination operations 502 that include accessing the storage operation suspend database 206 and determining whether the second storage operation instructed at block 308 is higher priority than the first storage operation that is currently being performed on the storage die in the storage subsystem 208. As will be appreciated by one of skill in the art in possession of the present disclosure, the relative priorities of storage operations may be identified in a variety of manners such as, for example, in a table of predetermined storage operation/storage operation priorities (e.g., generated by a storage device manufacturer) that may be stored in the storage operation suspend database 206, in a table of storage operation/storage operation performance time requirements (e.g., generated by a storage device manufacturer) that may be stored in the storage operation suspend database 206, and/or using a variety of other storage operation priority identification techniques that will fall within the scope of the present disclosure.

As such, at decision block 310 the storage operation suspend engine 204 in the storage device 200 may determine whether the second storage operation has a higher predefined priority than the first storage operation, whether the second storage operation is a higher priority operation than the first storage operation based on the ability to perform the second storage operation in a time period that is more than a threshold less than the first storage operation, and/or whether the second storage operation is a higher priority operation than the first storage operation based on any of a variety of storage operation relative priority information that one of skill in the art in possession of the present disclosure would recognize as being beneficial in determining the relative priorities of different storage operations.

If, at decision block 310, it is determined that the second storage operation is not higher priority than the first storage operation, the method 300 proceeds to block 312 where the storage device completes the first storage operation on the storage die in the storage subsystem. With reference to FIG. 6A, in an embodiment of block 312, the storage operation suspend engine 204 in the storage device 200 may perform storage operation completion operations 600 that include completing the first storage operation on the storage die in the storage subsystem 208 that was begun at block 306. To continue with the specific examples provided above, at block 312 the storage operation suspend engine 204 may complete the program storage operation or erase storage operation on the storage die in the storage subsystem 208 that was begun at block 306. As such, in the event the storage operation suspend engine 204 begins a storage operation on a storage die in the storage subsystem 208 and no higher priority storage operations are instructed that will be performed on that storage die, the storage operation suspend engine 204 will complete that storage operation on that storage die.

Figure 6B:
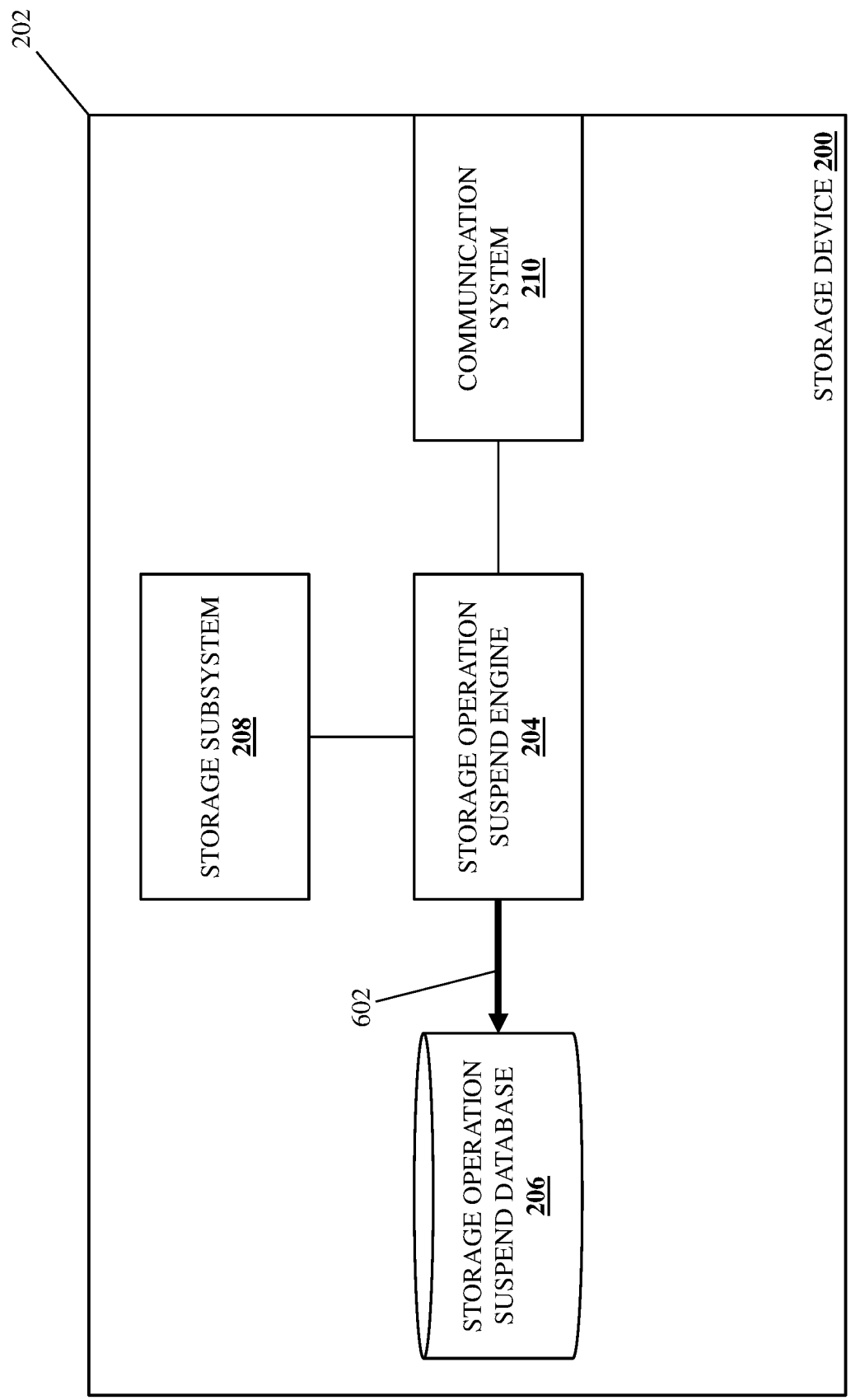
FIG. 6B is a schematic view illustrating an embodiment of the storage device of FIG. 2 operating during the method of FIG. 3.

The method 300 then proceeds to block 314 where the storage device returns the power allocated to the first storage operation to the power budget. With reference to FIG. 6B, in an embodiment of block 314, the storage operation suspend engine 204 in the storage device 200 may perform allocated power returning operations 602 that include returning power that was allocated to the first storage operation that was completed at block 312 to the power budget that may be tracked in the storage operation suspend database 206. To continue with the specific examples provided above, at block 312 the storage operation suspend engine 204 may complete the program storage operation or erase storage operation on the storage die in the storage subsystem 208 and, in response, may "return" any power credits that were allocated to the program storage operation or erase storage operation by, for example, adding those power credits back to the power credit budget information that provides the power credit budget in the storage operation suspend database 206. As such, in the event the storage operation suspend engine 204 completes a storage operation on a storage die in the storage subsystem 208, the storage operation suspend engine 204 will return power allocated for that storage operation to its power budget.

Figure 6C:
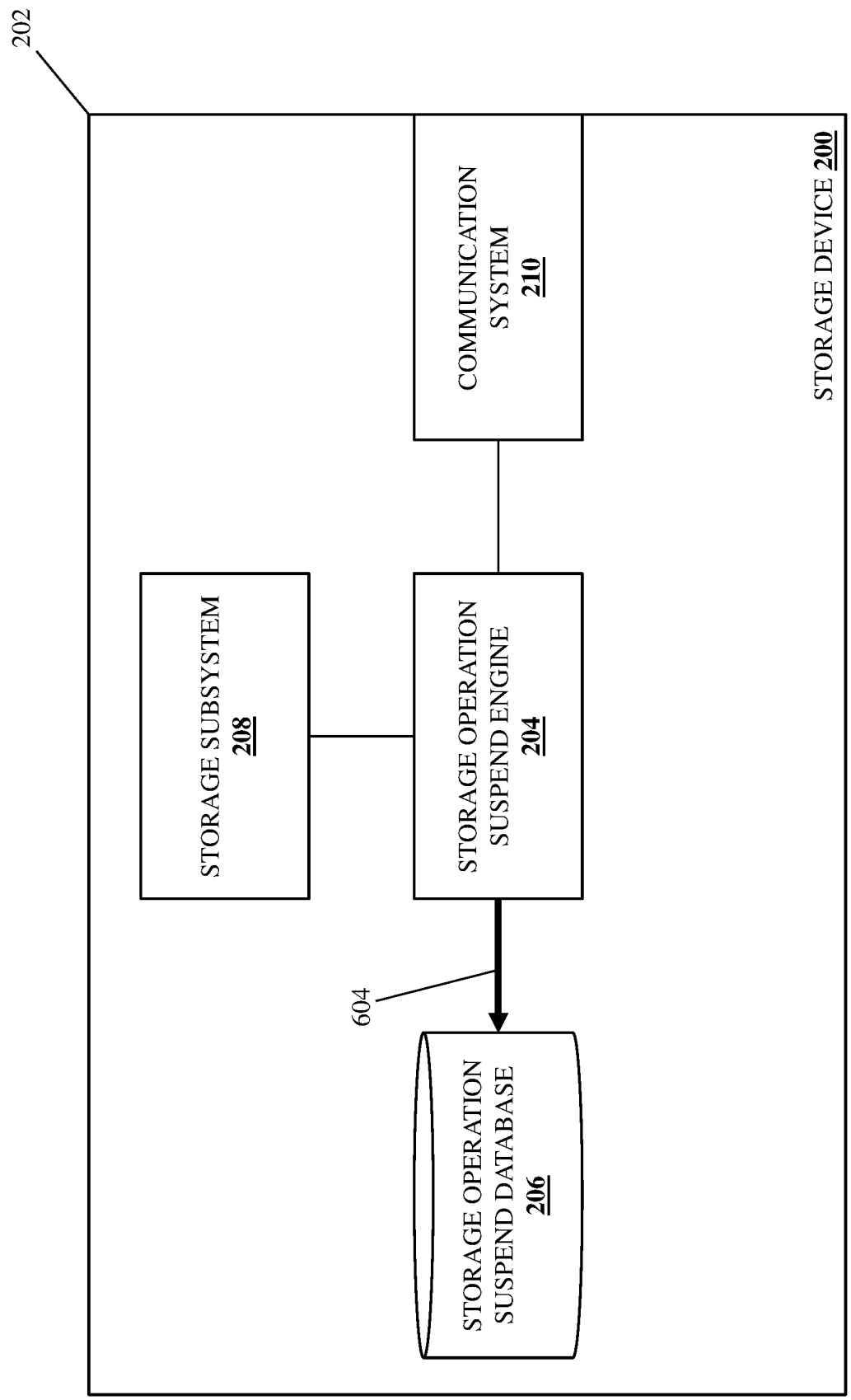
FIG. 6C is a schematic view illustrating an embodiment of the storage device of FIG. 2 operating during the method of FIG. 3.
Figure 6D:
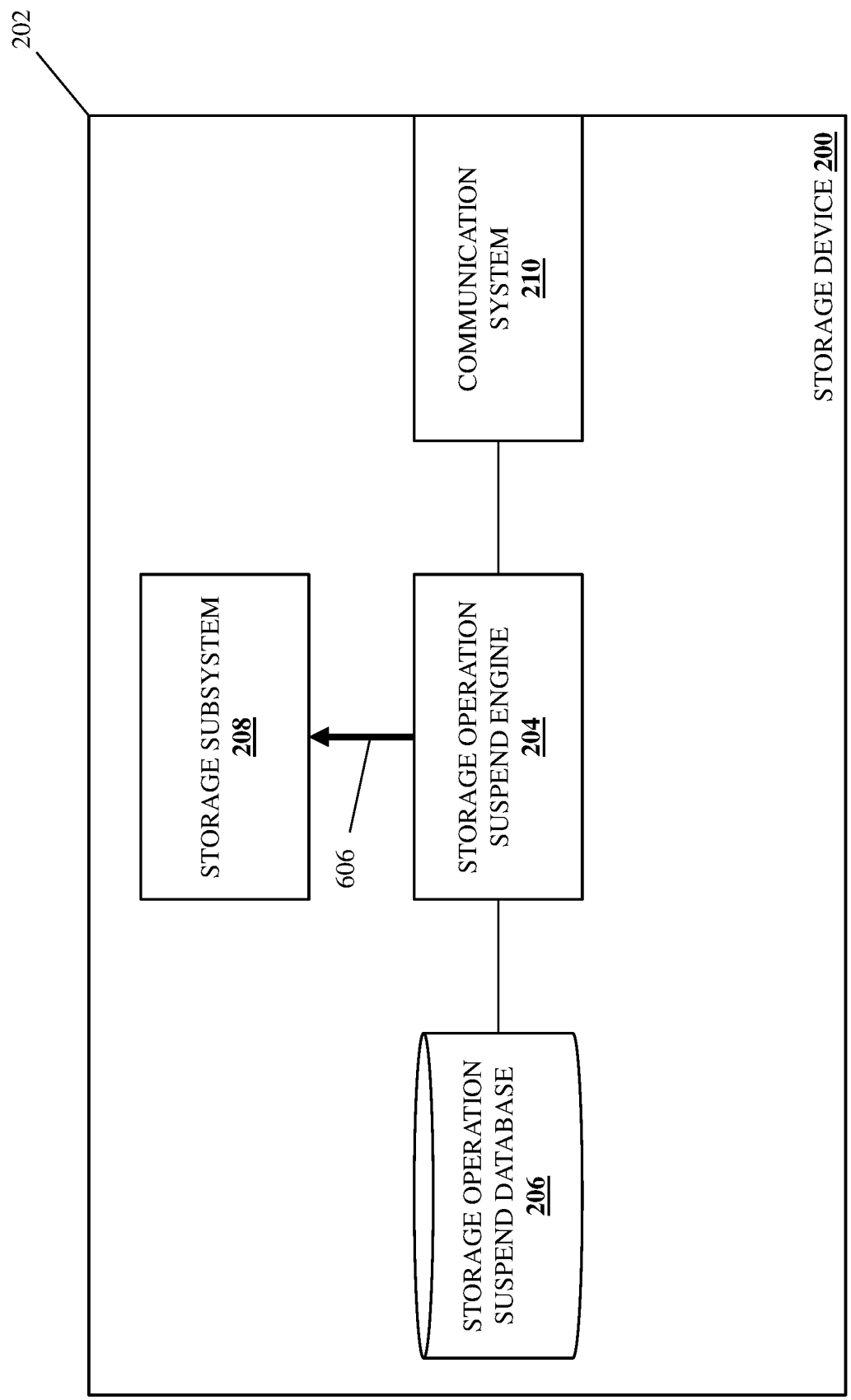
FIG. 6D is a schematic view illustrating an embodiment of the storage device of FIG. 2 operating during the method of FIG. 3.

The method 300 then proceeds to block 316 where the storage device allocates power from the power budget to the second storage operation. With reference to FIG. 6C, in an embodiment of block 316, the storage operation suspend engine 204 in the storage device 200 may perform power allocation operations 604 that include allocating power from the power budget that may be tracked in the storage operation suspend database 206 to the second storage operation in a manner that is substantially similar to that described for the allocation of power to the first storage operation at block 304. The method 300 then proceeds to block 318 where the storage device performs the second storage operation on a storage die in the storage subsystem. With reference to FIG. 6D, in an embodiment of block 318, the storage operation suspend engine 204 in the storage device 200 may perform storage operation performance operations 606 that include performing the second storage operation in a manner that is substantially similar to that described for the performance of the first storage operation at blocks 306 and 312.

However, while the performance of the second storage operation is illustrated and described at block 318 as both beginning and completing in a single block of the method 300, one of skill in the art in possession of the present disclosure will appreciate that following the completion of the first storage operation at block 312 and the return of the power allocated for the first storage operation to the power budget at block 314, the treatment of the second storage operation illustrated at blocks 316 and 318 may proceed as described above for the first storage operation at blocks 304-310 of the method 300 (e.g., in the event a third storage operation is instructed that will be performed on the same storage die in the storage subsystem 208 that the second storage operation is currently being performed). As such, as long as a storage operation performed on a storage die in the storage subsystem 208 is the highest priority storage operation instructed for that storage die, that storage operation will be completed and its allocated power returned to the power budget prior to the allocation of power from the power budget to lower priority storage operation(s)/the performance of lower priority storage operation(s).

Figure 7:
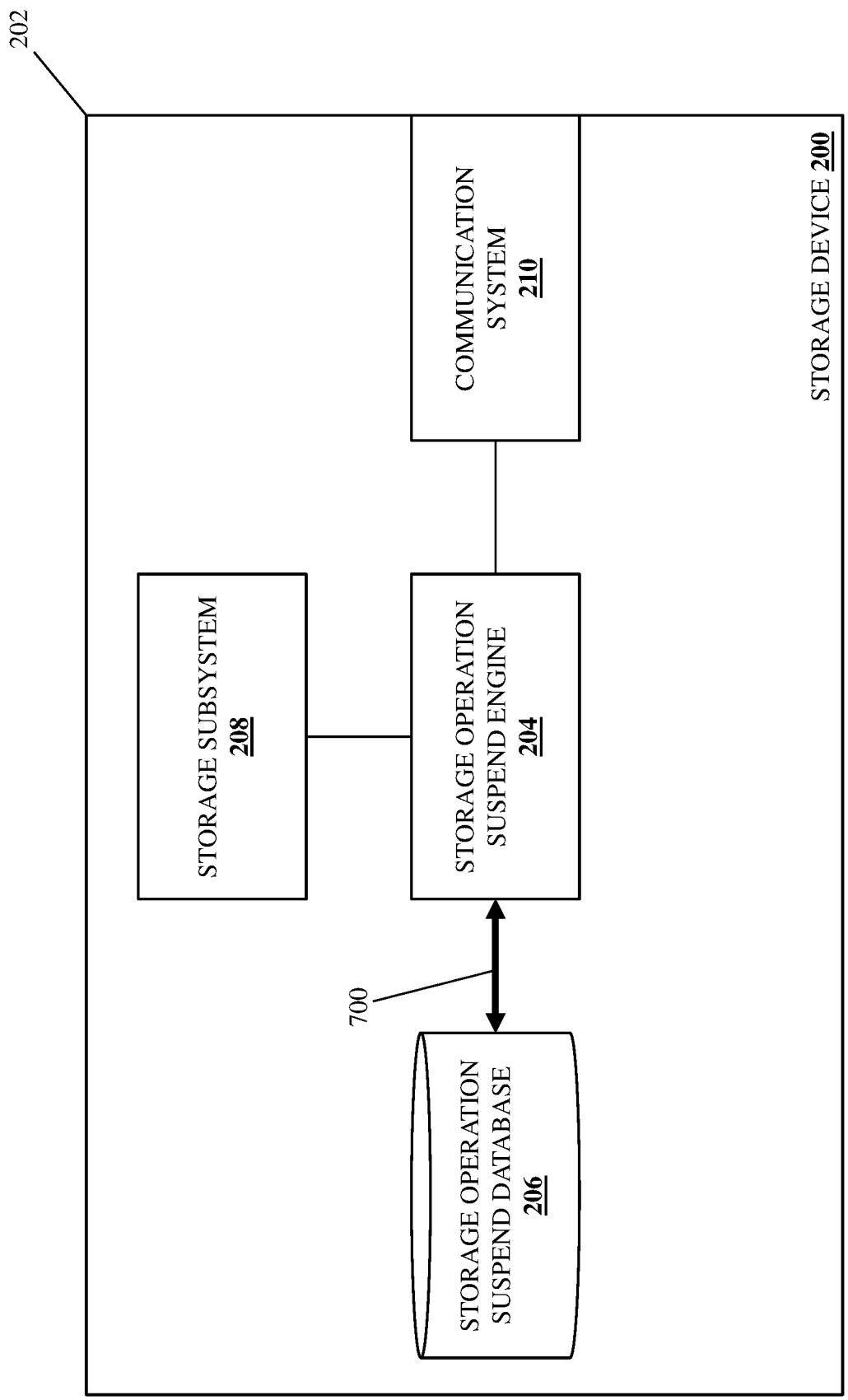
FIG. 7 is a schematic view illustrating an embodiment of the storage device of FIG. 2 operating during the method of FIG. 3.

If, at decision block 310, it is determined that the second storage operation is higher priority than the first storage operation, the method 300 proceeds to decision block 320 where it is determined whether power available in the power budget and power allocated to the first storage operation is sufficient to perform the second storage operation (if the first storage operation is suspended). With reference to FIG. 7, in an embodiment of decision block 320, the storage operation suspend engine 204 in the storage device 200 may perform power availability determination operations 700 that include determining whether power available in the power budget that may be tracked in the storage operation suspend database 206 and the power allocated from that power budget to the first storage operation is sufficient to perform the second storage operation in the event the first storage operation is suspended. For example, the power availability determination operations 700 may include the storage operation suspend engine 204 identifying the power credits required to perform the second storage operation (e.g., using the storage operation power credit table above), identifying the power credits required to perform the first storage operation (e.g., using the storage operation power credit table above, based on the power allocated to the first storage operation at block 304, etc.), and identifying an amount of power currently available in the power credit budget.

In an embodiment, decision block 320 may then continue with the storage operation suspend engine 204 determining whether the power available in the power budget (PPB) and the power allocated to the first storage operation ($P_{1ST}$) is greater than or equal to the power required for the second storage operation ($P_{2ND}$), or:

$$P_{PB}+P_{1ST} \geq P_{2ND}$$

One of skill in the art in possession of the present disclosure will appreciate that if the power available in the power budget ($P_{PB}$) and the power allocated to the first storage operation ($P_{1ST}$) is greater than or equal to the power required for the second storage operation ($P_{2ND}$), then there is sufficient power available to perform the second storage operation if the first storage operation is suspended, while if the power available in the power budget ($P_{PB}$) and the power allocated to the first storage operation ($P_{1ST}$) is less than the power required for the second storage operation ($P_{2ND}$), then there is not sufficient power available to perform the second storage operation if the first storage operation is suspended.

In other words, the storage operation suspend engine 204 considers the power currently allocated to the first storage operation being performed on a storage die in the storage subsystem 208 when determining whether to suspend that first storage operation and perform a second storage operation on that storage die, as the inventors of the present disclosure have recognized that the suspension of the performance of the first storage operation on the storage die without returning its allocated power to the power budget means that allocated power is available for the second storage operation being performed on that storage die. As such, in the event that power currently allocated to the first storage operation plus any other power available in the power budget is greater than the power needed to perform the second storage operation, then a determination that there is available power to suspend the first storage operation and perform the second storage operation will be made. As discussed in further detail below, the determination being made at decision block 320 may include a determination of whether the following inequality is satisfied in order to determine whether or not to suspend the first storage operations:

$$P_{PB} - \max(P_{2ND} - P_{1ST}, 0) \geq 0$$

To contrast the teachings of the present disclosure with conventional storage operation suspend systems, as discussed above those conventional storage operation suspend systems determine whether the power available in the power budget ($P_{PB}$) is greater than or equal to the power required for the second storage operation ($P_{2ND}$) when determining whether to suspend a first storage operation being performed on a storage die that the second storage operation will be performed on, or:

$$P_{PB} \geq P_{2ND}$$

One of skill in the art in possession of the present disclosure will recognize that, relative to the systems and methods of the present disclosure, conventional storage operation suspend techniques require more power to be available in the power budget (i.e., a higher $P_{PB}$ in the equation above) in order to suspend a first storage operation being performed on a storage die so that the second storage operation will be performed. Specifically, in the example provided above, the conventional storage operation suspend techniques require the available power in their power budgets to be $P_{1ST}$ greater than the required available power in the power budget for the storage device of the present disclosure in order to perform the same second storage operation having the $P_{2ND}$ power requirement.

If, at decision block 320, it is determined that the power available in the power budget and the power allocated to the first storage operation is not sufficient to perform the second storage operation (with the first storage operation suspended), the method 300 returns to block 320. As discussed in further detail below, the power available in the power budget and power allocated from that power budget to the first storage operation may not be sufficient to perform the second storage operation with the first storage operation suspended, and in such cases the method 300 may loop such that the storage operation suspend engine 204 continues to perform the power availability determination operations 700 to monitor if the power available in the power budget and the power allocated to the first storage operation is sufficient to perform the second storage operation (with the first storage operation suspended).

As will be appreciated by one of skill in the art in possession of the present disclosure, the method 300 illustrated in FIG. 3 and described below presumes that power sufficient to perform the second storage operation will become available before the first storage operations have been completed on the storage die. However, one of skill in the art in possession of the present disclosure will also appreciate how, in some embodiments, the first storage operation on the storage die may be completed (e.g., similarly as described above with reference to block 312), which will operate to free up the storage die, and in many cases enough power, to allow the second storage operation to be performed on that storage die. Thus, one of skill in the art in possession of the present disclosure will appreciate that, in the event the first storage operation is completed on the storage die before a determination is made at decision block 320 that there is sufficient power to perform the second storage operation on that storage die, the method 300 may then proceed substantially as described above with reference to blocks 312-318 (i.e., when the storage device completing the first storage operation on the storage die, returning power allocated for the first storage operation to the power budget, allocating power from the power budget to the second storage operation, and performing the second storage operation on the storage die).

Figure 8:
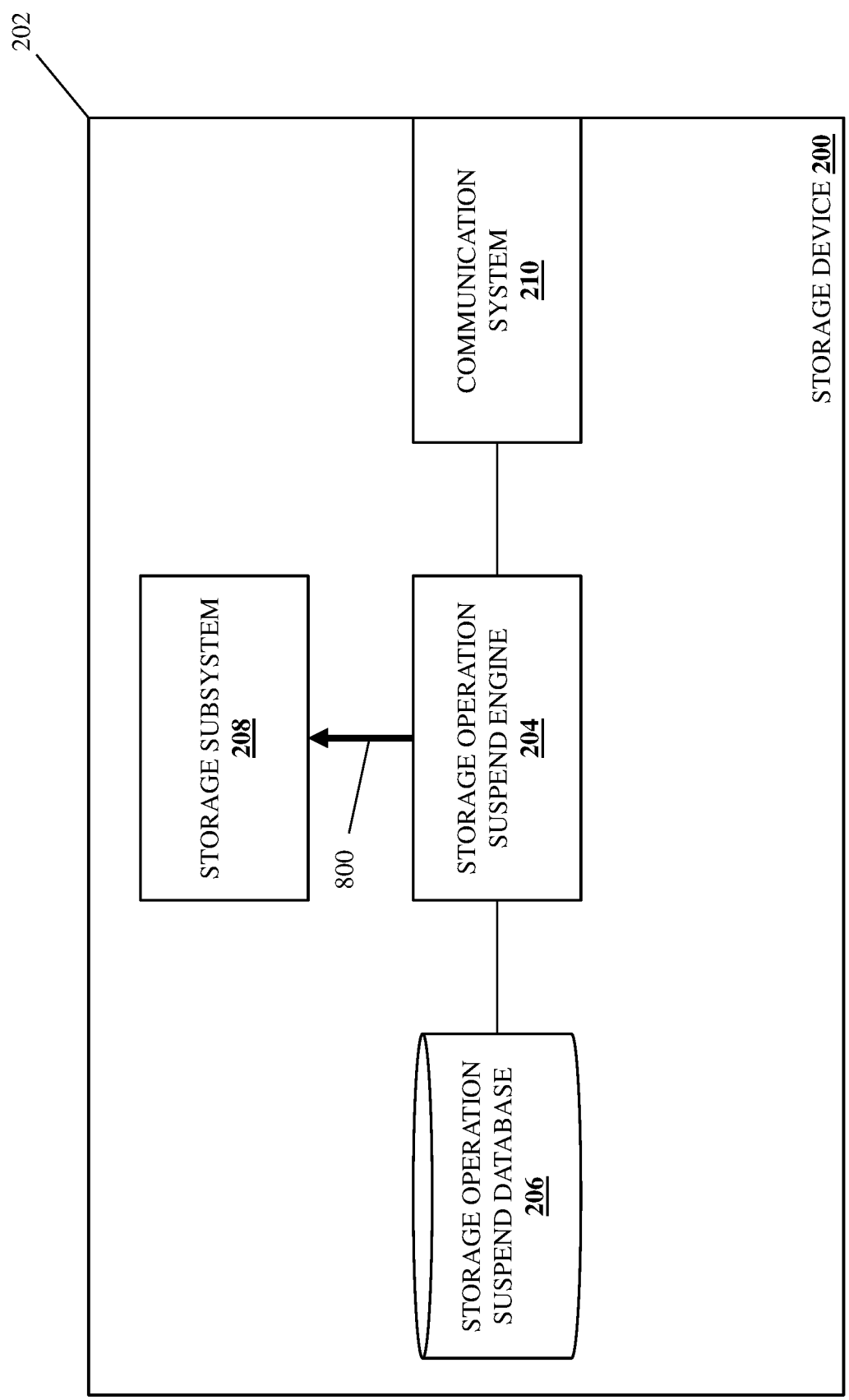
FIG. 8 is a schematic view illustrating an embodiment of the storage device of FIG. 2 operating during the method of FIG. 3.

If, at decision block 320, it is determined that the power available in the power budget and the power allocated to the first storage operation is sufficient to perform the second storage operation, the method 300 proceeds to block 322 where the storage device suspends the first storage operations on the storage die in the storage subsystem. With reference to FIG. 8, in an embodiment of block 322 and in response to determining that the power available in the power budget and the power allocated to the first storage operation is sufficient to perform the second storage operation at decision block 320, the storage operation suspend engine 204 may perform first storage operation suspend operations 800 that include suspending the performance of the first storage operation on the storage die in the storage subsystem 208. However, while suspension of a program storage operation or erase storage operation to perform a read storage operation is described herein, one of skill in the art in possession of the present disclosure will appreciate how any relatively high priority storage operation may be suspended for any relatively low priority storage operation (e.g., suspending a read storage operation for an administrative command storage operation, suspending a data transfer (e.g., a transfer of data from Dual Data Rate (DDR) memory to the NAND storage subsystem the purposes of subsequently programming the NAND storage subsystem) for a read storage operation or a program storage operation, etc.) while remaining within the scope of the present disclosure as well.

Continuing the example above directed to the power credit budget and power credits, the suspend scenario table below illustrates how the storage operation suspend engine 204 may operate in different scenarios:

| STORAGE OPERATION | POWER CREDITS | PROGRAM SUSPEND | ERASE SUSPEND |
|---|---|---|---|
| Single-Plane Read | 35 | max(35-50, 0) = 0 | max(35-60, 0) = 0 |
| Multi-Plane Read | 55 | max(55-50, 0) = 5 | max(55-60, 0) = 0 |
| Fast Multi-Plane Read | 65 | max(65-50, 0) = 15 | max(65-60, 0) = 5 |
| Program | 50 | N/A | N/A |
| Erase | 60 | N/A | N/A |

As will be appreciated by one of skill in the art in possession of the present disclosure, the suspend scenario table above is limited to scenarios in which the first storage operation is either a program storage operation or an erase storage operation, and the second storage operation is one of a plurality of read storage operations (e.g., the single-plane read storage operation, the multi-plane read storage operation, or the fast multi-plane read storage operation in the suspend scenario table above), but one of skill in the art in possession of the present disclosure will recognize how similar tables may be generated for any combination of storage operations while remaining within the scope of the present disclosure.

In a first example and with reference to the suspend scenario table above, consider when a relatively high priority single-plane read storage operation (i.e., the second storage operation discussed above) is instructed and will be performed on a storage die upon which either a relatively low priority program storage operation or erase storage operation (i.e., the first storage operation discussed above) is currently being performed. As can be seen, the single-plane read storage operation requires 35 power credits from the power budget to perform, while the suspend decision power requirement ($P_{REQ}$) (discussed above) for the program storage operation returns a zero to indicate that there is sufficient power to suspend the program storage operation and perform the single-plane read storage operation, and the suspend decision power requirement ($P_{REQ}$) for the erase storage operation returns a zero to indicate that there is sufficient power to suspend the erase storage operation and perform the single-plane read storage operation.

In other words, because the program storage operation was allocated more power than is required to perform the single-plane read storage operation (i.e., 50 power credits vs. 35 power credits), the program storage operation may always be suspended to perform the single-plane read storage operation as the single-plane read storage operation requires fewer power credits than were allocated to the program storage operation (and that will remain allocated to the program storage operation after its suspension). Similarly, because the erase storage operation was allocated more power than is required to perform the single-plane read storage operation (i.e., 60 power credits vs. 35 power credits), the erase storage operation may always be suspended to perform the single-plane read storage operation as the single-plane read storage operation requires fewer power credits than were allocated to the erase storage operation (and that will remain allocated to the erase storage operation after its suspension).

In a second example and with reference to the suspend scenario table above, consider when a relatively high priority multi-plane read storage operation (i.e., the second storage operation discussed above) is instructed and will be performed on a storage die upon which either a relatively low priority program storage operation or erase storage operation (i.e., the first storage operation discussed above) is currently being performed. As can be seen, the multi-plane read storage operation requires 55 power credits from the power budget to perform, while the suspend decision power requirement ($P_{REQ}$) (discussed above) for the program storage operation returns a 5 to indicate that an additional 5 power credits are required from the power credit budget to suspend the program storage operation and perform the multi-plane read storage operation, and the suspend decision power requirement ($P_{REQ}$) for the erase storage operation returns a zero to indicate that there is sufficient power to suspend the erase storage operation and perform the multi-plane read storage operation.

In other words, because the program storage operation was allocated less power than is required to perform the multi-plane read storage operation (i.e., 50 power credits vs. 55 power credits), the program storage operation will only be suspended to perform the multi-plane read storage operation if there are 5 power credits available in the power credit budget. As such, in the event there are 5 power credits available in the power credit budget, the program storage operation may be suspended, 5 power credits may be allocated from the power credit budget (e.g., subtracted from the power credit budget as discussed above) to the multi-plane read storage operation, and the multi-plane read storage operation may be performed. However, because the erase storage operation was allocated more power than is required to perform the multi-plane read storage operation (i.e., 60 power credits vs. 55 power credits), the erase storage operation may always be suspended to perform the multi-plane read storage operation as the multi-plane read storage operation requires fewer power credits than were allocated to the erase storage operation (and that will remain allocated to the erase storage operation after its suspension).

In a third example and with reference to the suspend scenario table above, consider when a relatively high priority fast multi-plane read storage operation (i.e., the second storage operation discussed above) is instructed and will be performed on a storage die upon which either a relatively low priority program storage operation or erase storage operation (i.e., the first storage operation discussed above) is currently being performed. As can be seen, the fast multi-plane read storage operation requires 65 power credits from the power credit budget to perform, while the suspend decision power requirement ($P_{REQ}$) (discussed above) for the program storage operation returns a 15 to indicate that an additional 15 power credits are required from the power credit budget to suspend the program storage operation and perform the fast multi-plane read storage operation, and the suspend decision power requirement ($P_{REQ}$) for the erase storage operation returns a 5 to indicate that an additional 5 power credits are required from the power credit budget to suspend the erase storage operation and perform the fast multi-plane read storage operation.

In other words, because the program storage operation was allocated less power than is required to perform the fast multi-plane read storage operation (i.e., 50 power credits vs. 65 power credits), the program storage operation will only be suspended to perform the fast multi-plane read storage operation if there are 15 power credits available in the power credit budget. As such, in the event there are 15 power credits available in the power credit budget, the program storage operation may be suspended, 15 power credits may be allocated from the power budget (e.g., subtracted from the power budget as discussed above) to the fast multi-plane read storage operation, and the fast multi-plane read storage operation may be performed. Similarly, because the erase storage operation was allocated less power than is required to perform the fast multi-plane read storage operation (i.e., 60 power credits vs. 65 power credits), the erase storage operation will only be suspended to perform the fast multi-plane read storage operation if there are 5 power credits available in the power credit budget. As such, in the event there are 5 power credits available in the power credit budget, the erase storage operation may be suspended, 5 power credits may be allocated from the power credit budget (e.g., subtracted from the power credit budget as discussed above) to the fast multi-plane read storage operation, and the fast multi-plane read storage operation may be performed. However, while a few specific examples have been provided, one of skill in the art in possession of the present disclosure will appreciate how the teachings of the present disclosure may be utilized to determine whether to suspend any of a variety of first storage operations in order to perform any of a variety of second storage operations based on power considerations while remaining within the scope of the present disclosure as well.

Figure 9:
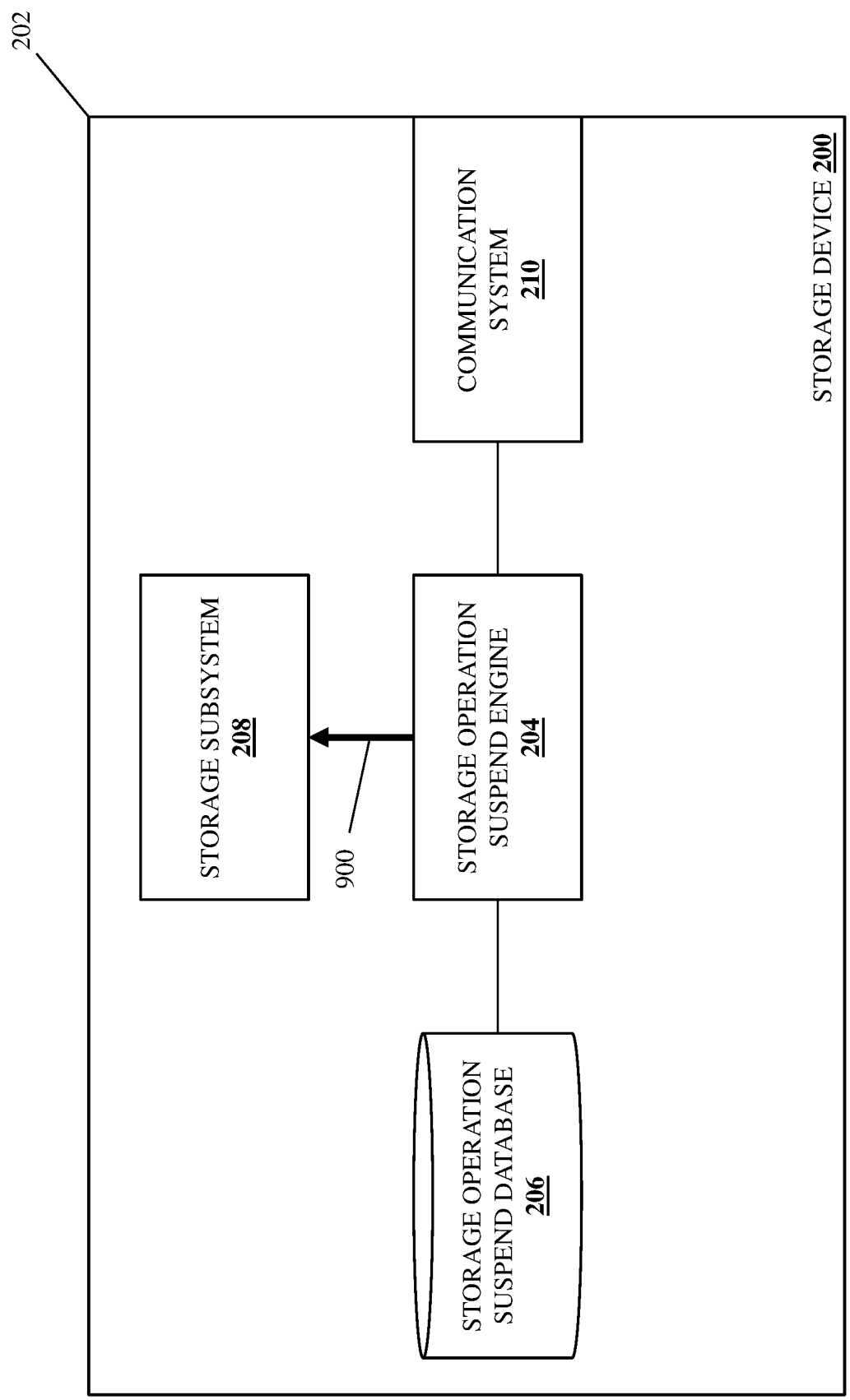
FIG. 9 is a schematic view illustrating an embodiment of the storage device of FIG. 2 operating during the method of FIG. 3.

The method 300 then proceeds to block 324 where the storage device performs the second storage operation on the storage die in the storage subsystem. With reference to FIG. 9, in an embodiment of block 324 and subsequent to suspending the performance of the first storage operation on the storage die in the storage subsystem 208, the storage operation suspend engine 204 in the storage device 200 may perform second storage operation performance operations 900 that include performing the second storage operations on that storage die in the storage subsystem 208.

However, while the method 300 and associated description provides an example of the suspension of a first storage operation for a single second storage operation, one of skill in the art in possession of the present disclosure will appreciate how a plurality of storage operations (e.g., a third storage operation, a fourth storage operation, etc.) may be performed while the first storage operation is suspended while remaining within the scope of the present disclosure as well. For example, the first storage operation may be suspended to perform the second storage operation substantially as discussed below, and a third storage operation instruction to perform a third storage operation may be received. In the event that third storage operation is higher priority than the first storage operation and there is power available to perform that third storage operation after the second storage operation has been completed (and hence its power credits have been returned to the power credit budget) while the first storage operation remains suspended, then the first storage operation may remain suspended while the third storage operation is performed. One of skill in the art in possession of the present disclosure will appreciate that similar functionality may be provided for further storage operations that are instructed and that have higher priority than the first storage operation, but may be limited to ensure that the first storage operation is not suspended for more than its suspended time limit.

Furthermore, while the second storage operation is described as being completed once the first storage operation is suspended, one of skill in the art in possession of the present disclosure will also appreciate how the teachings of the present disclosure may allow the second storage operation to be suspended for a higher priority third storage operation in substantially the same manner as described above for the first storage operation, but such functionality may be limited to ensure that the first storage operation and/or the second storage operation are not suspended for more than their suspended time limits.

The method 300 then proceeds to block 326 where the storage device resumes and completes the first storage operation on the storage die in the storage subsystem. With reference to FIG. 10, in an embodiment of block 326 and subsequent to completing the second storage operation on the storage die in the storage subsystem 208, the storage operation suspend engine 204 in the storage device 200 may perform first storage operation resuming operations 1000 that include resuming the performance of the first storage operation on the storage die in the storage subsystem 208 and completing the first storage operation. However, while the first storage operation is described as being completed once resumed, one of skill in the art in possession of the present disclosure will also appreciate how the teachings of the present disclosure may allow the first storage operation to again be suspended prior to completion for a higher priority third storage operation in substantially the same manner as described above, but such functionality may be limited to ensure that the first storage operation is not suspended for more than its suspended time limit.

As discussed above, the power allocated to the first storage operation may remain allocated to the first storage operation during its suspension and while the second storage operation is performed based on that power allocated to the first storage operation (plus any additional power required from the power budget, if necessary), which ensures that the first storage operation may be resumed immediately following the performance of the second storage operation (i.e., because the power allocated to the first storage operation was not returned to the power budget, and thus cannot be allocated to other storage operations).

However, one of skill in the art in possession of the present disclosure will appreciate how at least some power remaining allocated to the first storage operation may go unused, as the second storage operation may not require at least some of that power (i.e., as in the example above for the suspension of program storage operations or erase storage operations for single-plane read storage operations, or the suspension of erase storage operations for multi-plane read storage operations). In some embodiments of the present disclosure, power credits that are allocated to the first storage operation and that are not required to perform the second storage operation may be returned to the power credit budget if the current suspension time for the first storage operation is a threshold level below its suspended time limit.

To use the example of the suspension of the program storage operation for the single-plane read storage operation discussed above, in some embodiments the 15 power credits that are not required to perform the single-plane read storage operation but that were allocated to the program storage operation may be returned to the power credit budget if its current suspension time is 0.5 ms less than its suspended time limit (e.g., 3 ms) (i.e., if it has been suspended for less than 2.5 ms), and one of skill in the art in possession of the present disclosure will appreciate how the threshold level discussed above may be selected to ensure that the first storage operation has sufficient time to be reallocated those power credits needed so that it may be resumed and completed without going over the suspended time limit. Furthermore, while the return of only a portion of storage operation allocated power to the power budget during suspension of a corresponding storage operation has been described, one of skill in the art in possession of the present disclosure will recognize that similar techniques may be utilized to return all power allocated to a suspended storage operation to the power budget while remaining within the scope of the present disclosure as well.

Thus, systems and methods have been described that provide for the suspension of a first storage operation being performed on a storage die so that a second storage operation may be performed on that storage die when power currently available in a power budget and power allocated to the first storage operation is sufficient to perform the second storage operation. For example, the storage operation suspend system of the present disclosure may include a chassis having a storage operation suspend subsystem coupled to each of a communication system and a storage subsystem in the chassis. The storage operation suspend subsystem performs a first storage operation on a storage die in the storage subsystem, receives a second storage operation instruction via the communication system to perform a second storage operation on the storage die, determines that the second storage operation is a higher priority operation than the first storage operation, determines that a first power amount available in a power budget and a second power amount allocated from the power budget to the first storage operation is sufficient to perform the second storage operation when the first storage operation is suspended and, in response, suspends the first storage operation and performs the second storage operation and, following completion of the second storage operation, resumes performance of the first storage operation. As such, the power required from a power budget to perform a higher priority storage operation while a lower priority storage operation is suspended is reduced, allowing more higher priority storage operations to be performed on a storage device while ensuring that the lower priority storage operations may be resumed and completed prior to their suspension time limit. Furthermore, because read storage operations are typically designated as higher priority relative to program storage operations and erase storage operations, the teachings provided herein may be utilized to improve read throughput and QoS in storage devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage operation suspend system, comprising:
   a chassis;
   a communication system that is included in the chassis;
   a storage subsystem that is included in the chassis; and
   a storage operation suspend subsystem that is included in the chassis and coupled to each of the communication system and the storage subsystem, wherein the storage operation suspend subsystem is configured to:
      perform a first storage operation on a storage die included in the storage subsystem;
      receive, via the communication system, a second storage operation instruction to perform a second storage operation on the storage die in the storage subsystem;
      determine that the second storage operation is a higher priority operation than the first storage operation;
      determine that a first power amount available in a power budget and a second power amount allocated from the power budget to the first storage operation is sufficient to perform the second storage operation when the first storage operation is suspended and, in response, suspend the first storage operation and perform the second storage operation; and
      resume, following completion of the second storage operation, performance of the first storage operation.

2. The system of claim 1, wherein the storage operation suspend subsystem is configured to:
   receive, via the communication system, a first storage operation instruction to perform the first storage operation; and
   allocate the second power amount from the power budget to the first storage operation.

3. The system of claim 1, wherein the first storage operation is either a program storage operation or an erase storage operation.

4. The system of claim 3, wherein the second storage operation is a read storage operation.

5. The system of claim 1, wherein the storage subsystem is a NAND storage subsystem, and wherein the storage die is a NAND storage die.

6. The system of claim 1, wherein the second power amount allocated from the power budget to the first storage operation remains allocated to the first storage operation while the first storage operation is suspended and the second storage operation is performed.

7. An Information Handling System (IHS), comprising:
   a processing system; and
   a memory system that is coupled to the processing system and that includes instructions that, when executed by the processing system, cause the processing system to provide a storage operation suspend engine that is configured to:
      perform a first storage operation on a storage die included in a storage subsystem;
      receive a second storage operation instruction to perform a second storage operation on the storage die in the storage subsystem;
      determine that the second storage operation is a higher priority operation than the first storage operation;
      determine that a first power amount available in a power budget and a second power amount allocated from the power budget to the first storage operation is sufficient to perform the second storage operation when the first storge operation is suspended and, in response, suspend the first storage operation and perform the second storage operation; and
      resume, following completion of the second storage operation, performance of the first storage operation.

8. The IHS of claim 7, wherein the storage operation suspend subsystem is configured to:
   receive a first storage operation instruction to perform the first storage operation; and
   allocate the second power amount from the power budget to the first storage operation.

9. The IHS of claim 7, wherein the first storage operation is either a program storage operation or an erase storage operation.

10. The IHS of claim 9, wherein the second storage operation is a read storage operation.

11. The IHS of claim 7, wherein the storage subsystem is a NAND storage subsystem, and wherein the storage die is a NAND storage die.

12. The IHS of claim 7, wherein the second power amount allocated from the power budget to the first storage operation remains allocated to the first storage operation while the first storage operation is suspended and the second storage operation is performed.

13. The IHS of claim 7, wherein the determining that the first power amount available in the power budget and the second power amount allocated from the power budget to the first storage operation is sufficient to perform the second storage operation includes:
   retrieving, from a storage subsystem suspend database, the second power amount that was predetermined to provide sufficient power to perform the first storage operation;

retrieving, from the storage subsystem suspend database, a third power amount that was predetermined to provide sufficient power to perform the second storage operation; and determining that a sum of the first power amount and the second power amount is greater than or equal to the third power amount.

14. A method for suspending operations in a storage device, comprising:

performing, by a storage device, a first storage operation on a storage die included in a storage subsystem in the storage device;

receiving, by the storage device, a second storage operation instruction to perform a second storage operation on the storage die in the storage subsystem;

determining, by the storage device, that the second storage operation is a higher priority operation than the first storage operation;

determining, by the storage device, that a first power amount available in a power budget and a second power amount allocated from the power budget to the first storage operation is sufficient to perform the second storage operation when the first storage operation is suspended and, in response, suspend the first storage operation and perform the second storage operation; and resuming, by the storage device following completion of the second storage operation, performance of the first storage operation.

15. The method of claim 14, further comprising:

receiving, by the storage device, a first storage operation instruction to perform the first storage operation; and allocating, by the storage device, the second power amount from the power budget to the first storage operation.

16. The method of claim 14, wherein the first storage operation is either a program storage operation or an erase storage operation.

17. The method of claim 16, wherein the second storage operation is a read storage operation.

18. The method of claim 14, wherein the storage subsystem is a NAND storage subsystem, and wherein the storage die is a NAND storage die.

19. The method of claim 14, wherein the second power amount allocated from the power budget to the first storage operation remains allocated to the first storage operation while the first storage operation is suspended and the second storage operation is performed.

20. The method of claim 14, wherein the determining that the first power amount available in the power budget and the second power amount allocated from the power budget to the first storage operation is sufficient to perform the second storage operation includes:

retrieving, from a storage subsystem suspend database, the second power amount that was predetermined to provide sufficient power to perform the first storage operation;

retrieving, from the storage subsystem suspend database, a third power amount that was predetermined to provide sufficient power to perform the second storage operation; and determining that a sum of the first power amount and the second power amount is greater than or equal to the third power amount.

* * * * *